(12) United States Patent
Moody (10) Patent No.: US 6,462,894 B1
(45) Date of Patent: Oct. 8, 2002

(54) MONOCULAR MOUNTING FOR FOUR-TUBE PANORAMIC NIGHT VISION GOGGLE HAVING MULTI-FUNCTION ADJUSTMENT CONTROL

(75) Inventor: Scott D. Moody, Merrimack, NH (US)

(73) Assignee: Insight Technology, Inc., Londonberry, NH (US)

( * ) Notice: Subject to any disclaimer, the term of this patent is extended or adjusted under 35 U.S.C. 154(b) by 0 days.

(21) Appl. No.: 09/784,354

(22) Filed: Feb. 16, 2001

(51) Int. Cl.[7] .............................. G02B 7/02; G02B 23/00
(52) U.S. Cl. .......................................... 359/815; 359/411
(58) Field of Search .................................. 359/630, 631, 359/632, 633, 411, 415, 416, 414, 419, 420, 421, 433, 13; 345/7, 8, 9

(56) References Cited

U.S. PATENT DOCUMENTS

| | | | |
|---|---|---|---|
| 4,299,440 A | * | 11/1981 | Hodgson ..................... 359/393 |
| 4,323,298 A | * | 4/1982 | Brennan ..................... 359/411 |
| 4,449,787 A | * | 5/1984 | Burbo et al. ................ 313/524 |
| 6,075,644 A | * | 6/2000 | Filipovich .................... 359/407 |
| 6,081,094 A | * | 6/2000 | Crenshaw et al. .......... 320/114 |
| 6,201,641 B1 | * | 3/2001 | Filipovich .................... 359/419 |

* cited by examiner

*Primary Examiner*—Loha Ben
*Assistant Examiner*—Saeed Seyrafi
(74) *Attorney, Agent, or Firm*—Mintz Levin Cohn Ferris Glovsky and Popeo, P.C.

(57) ABSTRACT

There is disclosed a multi-channel panoramic night vision goggle (PNVG) system having two monocular subassemblies, each having a first channel and a second channel, each channel having an optical axis. A mounting structure, having a right and a left side, and having two angled mounting shoes may be used to mount the monocular subassemblies. The angled mounting shoes permit a single monocular subassembly to be attached to either side of the mounting structure, yet permit an optical axis of one of the first or second channels to be substantially coaxial with a user's optical axis and permits the other of the first and second channels to be at an angle not coaxial or parallel with the user's optical axis. In addition, a multi-function control may be provided to enable adjustment of the monocular subassemblies along one or more orientation axes.

4 Claims, 7 Drawing Sheets

MONOCULAR MOUNTING FOR FOUR-TUBE PANORAMIC NIGHT VISION GOGGLE HAVING MULTI-FUNCTION ADJUSTMENT CONTROL

RELATED APPLICATIONS

This application is related to application Ser. No. 09/784313, filed concurrently.

FIELD OF THE INVENTION

The invention relates to a monocular mounting for a multi-channel panoramic night vision goggle system having multi-function adjustment controls.

BACKGROUND OF THE INVENTION

Panoramic Night Vision Goggle (PNVG) systems are known. For example, U.S. Pat. No. 6,075,644, which is hereby incorporated by reference, describes one known PNVG system using so called "folded optics" to resolve an image. Existing systems may have drawbacks.

One type of PNVG, implementing a straight through optical path, comprises two monocular subassemblies, each containing two image channels. The subassemblies may be mounted, for example, to a helmet, other headpiece, or other mounting structure. Each monocular subassembly has an inner channel and an outer channel. In one configuration, the inner channels have an optical axis that is substantially coaxial with the user's optical axis and have a partially overlapping field of view (FOV). For example, each may have approximately a 40° FOV. The outer channels have an optical axis that is angled with respect to the user's optical axis so that peripheral vision may be used to see over a greater field of view. For example, the outer channels may have an optical axis that forms an angle (e.g., approximately 28.5° or other angle) with respect to the optical axis of the inner channel.

Given the configuration described above, a standard mount would require that there be a designated right assembly and a designated left assembly and that each be manufactured as different components. This is a drawback because, among other things, it requires two separate and unique parts, which is less than desirable.

Another problem with prior systems is that the electrical connection of the monocular subassemblies to the system typically involve soldering of the contacts. This presents a problem when trying to remove/replace the monocular subassembly and typically requires resoldering. This is a drawback.

An important aspect of a PNVG system is the ability to adjust the monocular subassemblies to accommodate a particular user and to control the electronics. Prior systems have various problems and drawbacks with respect to the ease with which adjustments and control are implemented. This is a drawback.

Other drawbacks exist.

SUMMARY OF THE INVENTION

An object of the invention is to overcome these and other drawbacks of PNVG systems.

Another object of the invention is to provide a unique monocular subassembly and mounting structure for a multi-channel PNVG system that avoids the need for a separately designated left and right monocular subassemblies and permits a common monocular subassembly module that can be used on either the left or right side of a PNVG system.

Another object of the invention is to provide a hot shoe connector for a PNVG system that facilitates the attachment/reattachment of monocular subassemblies to the structure to which it is mounted (e.g., a helmet) and permits the electrical connection of the subassemblies to the system without soldering.

Another object of the invention is to provide a unique monocular mounting structure for a multi-channel PNVG system where the mounting structure both permits a common monocular module that can be used on either the left or right side and facilitates the attachment/reattachment of monocular subassemblies and permits the electrical connection of the subassemblies to the system without soldering.

According to one embodiment of the invention, multi-channel monocular subassemblies are mounted to a mounting structure by angled mounting shoes. The angled mounting shoes permit a single monocular design to be attached to either a left or right side of the PNVG system, yet when mounted permits the optical axis of an inner channel to be substantially coaxial with a user's optical axis and permits the optical axis of an outer channel to be at an angle not coaxial or parallel with the user's optical axis. For example, but without limitation, the angle between the optical axis of the inner and outer channels may be any suitable angle, for example, about 27–30°; but preferably about 28.5°.

According to one embodiment, the monocular subassembly is mounted to a mounting structure. Complementary angled mounting shoes are located on the mounting structure and the monocular subassemblies. The angle of the mounting shoes, with respect to an axis of the mounting structure, may be about one-half the angle between the optical axes of the inner and outer channels of the monocular assembly. In this way, the same monocular assembly may be used on either the right or left side of the PNVG system and the desired optical relationships specified above will be attained.

According to another embodiment, the mount comprises hot shoe electrical connections to permit removal/replacement of the monocular subassemblies without soldering. According to one particular, but not limiting, embodiment, the hot shoe connection is part of the angled mounting shoes. An alien screw or other quick connect fastener also may be used to secure the subassembly.

DETAILED DESCRIPTION OF THE DRAWINGS

Figure 1:
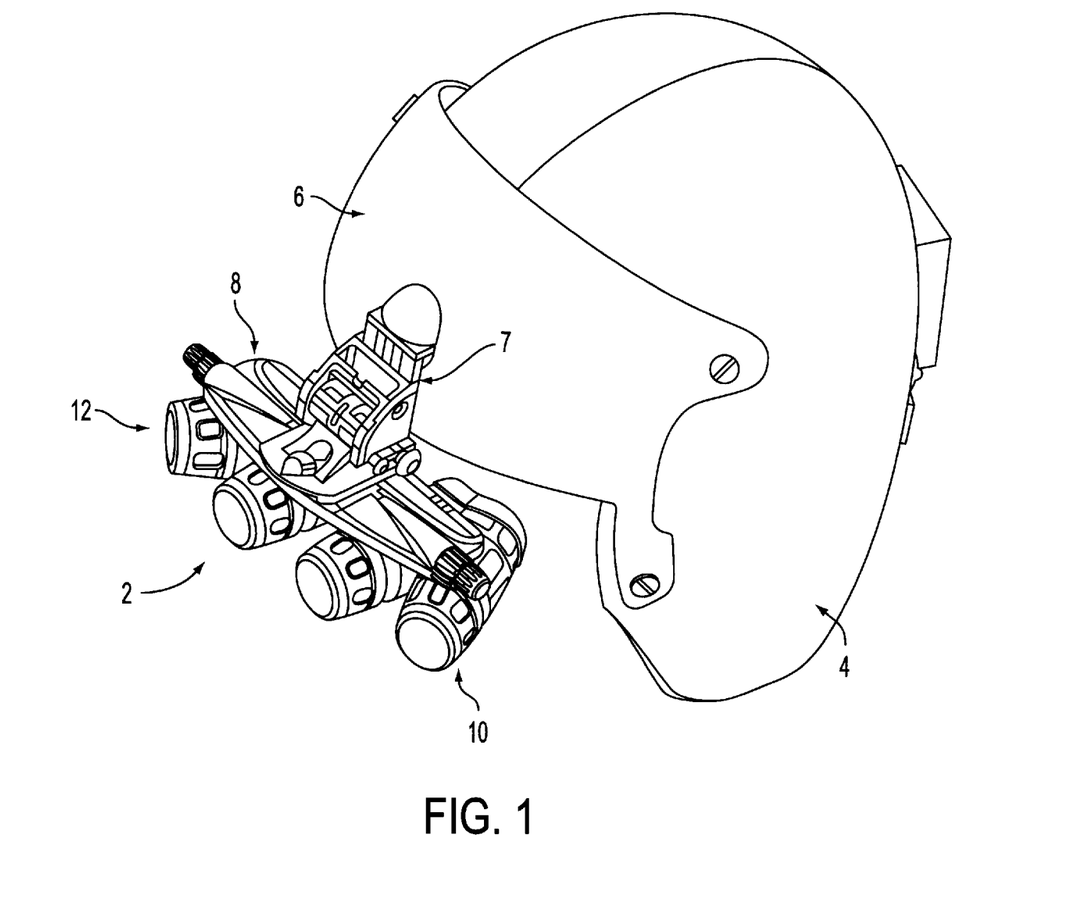
FIG. 1 shows a three quarter view of a multi-channel PNVG mounted according to an embodiment of the invention.

As shown in FIG. 1, PNVG System 2 may comprise at least two multi-channel monocular subassemblies 10 and 12, mounted to a headpiece (e.g., helmet 4 or other wearable head gear). In this embodiment, monocular subassemblies 10, 12 may be mounted to helmet 4 using a separate mounting structure 8. Other embodiments may comprise mounting structures that include, but are not limited to, structures integral with the headpiece, multiple part mounting structures, or other structures.

According to one embodiment of the invention the PNVG System 2 comprises a multi-channel PNVG system which may be mounted on or through a visor 6 of the helmet 4 by using visor mount 7. Other mounting locations that position the PNVG System 2 appropriately for the user to see through eyepiece portions of the PNVG System 2 are possible.

Figure 2:
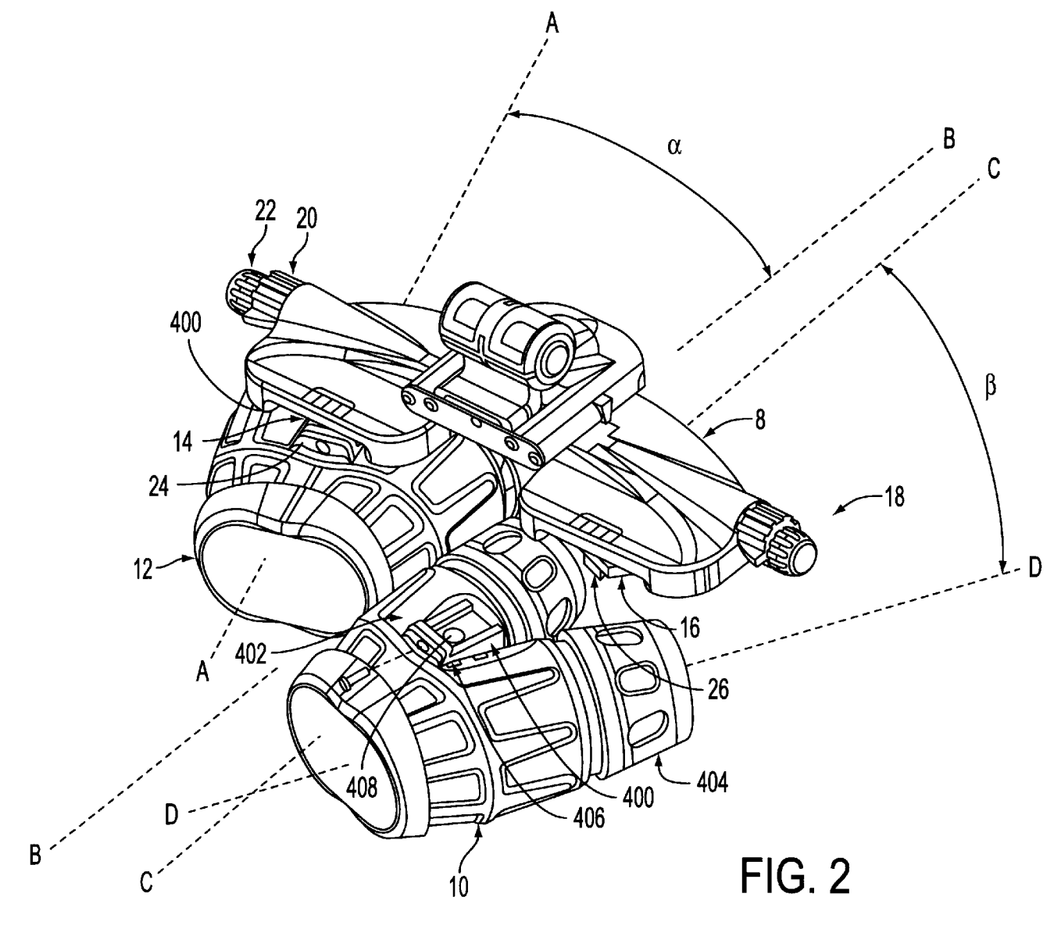
FIG. 2 shows a mounting structure for a multi-channel PNVG system according to an embodiment of the invention.

With reference to FIG. 2, mounting structure 8 may comprise a number of attachment mechanisms for attaching monocular assemblies. For example, mounting structure 8 may comprise a left mounting portion 14 and a right mounting portion 16.

In some embodiments of mounting structure 8 the left mounting portion 14 and right mounting portion 16 include an angled mounting shoe 24, 26 that cooperates with complementary shaped mounting portion 400 on monocular subassembly 10, 12. Other types of mounting mechanisms and configurations may be used.

Figure 3:
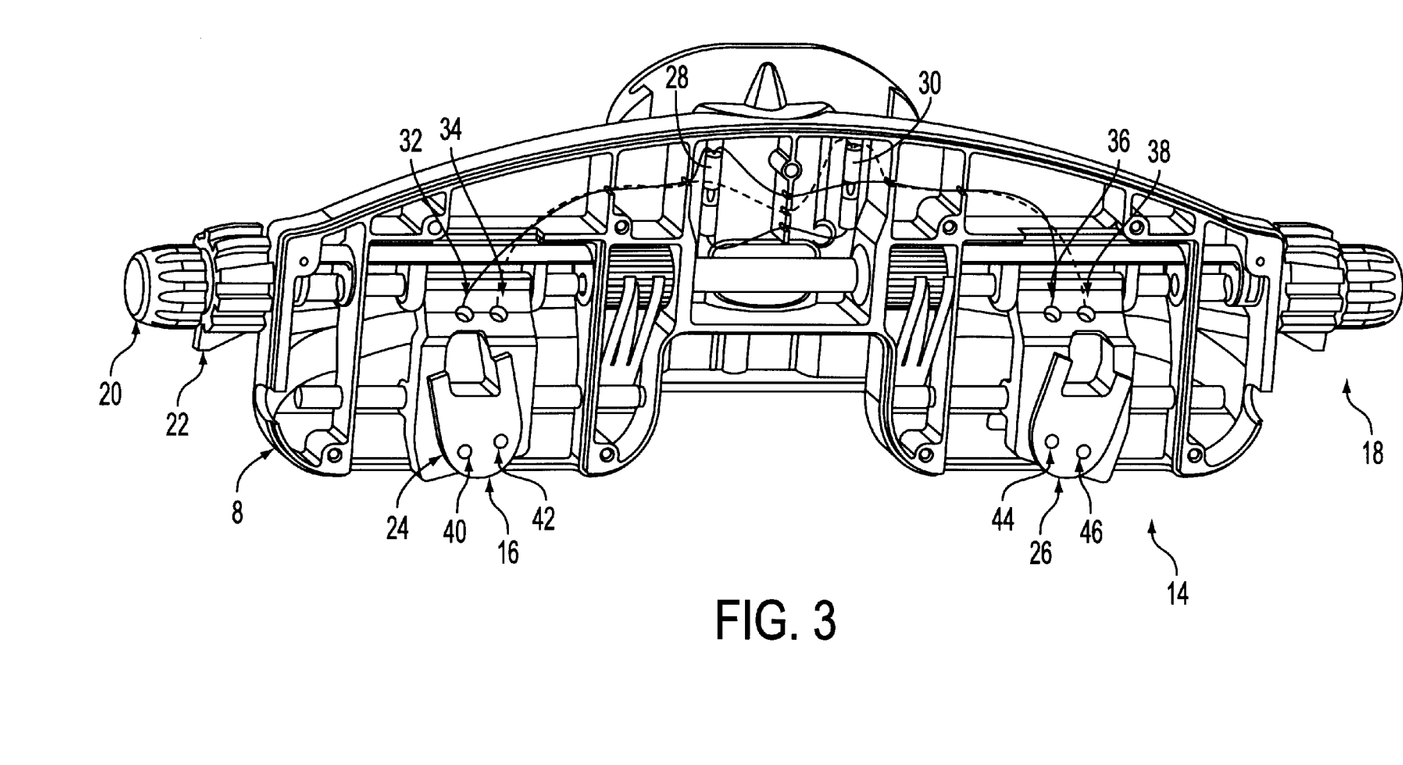
FIG. 3 is a bottom cut-away view of a mounting structure according to one embodiment of the invention.

For example, in the embodiment shown in FIG. 3, each mounting portion 14, 16 may include a mounting shoe 24 and 26, respectively. The mounting shoes 24, 26 may comprise a shaped protrusion (or a recessed portion) for mating with a complementary shaped recess (or protrusion) on the monocular subassembly (or other item to be mounted). For example, as shown in FIG. 2, mounting shoe 24, 26 may fit in a mating relationship with mounting portion 400 of monocular assembly 10, 12. Of course, other types of attachment mechanisms are possible (e.g., tongue-and-groove, snap-in, threaded, etc.).

According to one aspect of the invention, mounting shoes 24, 26 are mounted along an axis (e.g., axis A—A in FIG. 2) that is at an angle cc with respect to an axis that is substantially parallel with a user's line of sight (e.g., axis B—B in FIG. 2), which may be parallel with an optical axis of the inner channel 402. Preferably, the angle $\alpha$, is chosen to enable either monocular assembly (e.g., assembly 10 or 12) to be mounted on either mounting portion (14 or 16) and yet still achieve the desired optical configuration. In this manner, identical monocular assemblies may be used on the right and left side of the PNVG system. Among other things, this reduces manufacturing time and costs, and the number of unique parts compared with systems that have separately designated left and right subassemblies.

In some embodiments, the desired optical configuration may be achieved by mounting monocular subassemblies 10, 12 such that an optical axis of an inner channel 402 (e.g., axis C—C in FIG. 2) is substantially parallel to an axis of the user's line of sight (e.g., axis B—B). In addition, an optical axis of an outer channel 404 (e.g., axis D—D in FIG. 2) may be mounted at an angle $\beta$ with respect to an optical axis of inner channel 402 (e.g., axis C—C).

In some embodiments, angle $\alpha$ may be about half of the angle $\beta$. The angle $\beta$ may be about 27–30°; but preferably about 28.5°. However, the angle $\beta$ at which the channels are positioned may be any suitable angle for enabling panoramic viewing in a goggle system.

By configuring mounting shoes 24, 26 to be at an angle $\alpha$ of about half of the angle $\beta$, the total angle formed between the two mounting shoes 24, 26 will be roughly equivalent to the angle $\beta$.

When a monocular assembly 10, 12 is mounted on either mounting shoe 24, 26 inner monocular channel 402 is positioned with optical axis C—C substantially parallel to axis B—B. This enables a user to see a FOV that is substantially centered coaxially with the user's line of sight (e.g., parallel to axis B—B in FIG. 2) and extends laterally from axis B—B at an angle $\beta$ of one-half the FOV of a single channel (e.g., approximately 20 degrees) in both left and right directions. Thus, when two monocular subassemblies are mounted on mounting shoes, the inner channels will both point substantially straight ahead in a fashion similar to typical binoculars. The outer channels will point in a direction defined by angle $\beta$ (e.g., 28.5° in some embodiments) and will afford an increased panoramic field of view. A further advantage of the above described mounting scheme is that either monocular assembly will mount properly on either mounting shoe and still result in the above described desirable monocular channel positioning. Thus, a single monocular assembly can serve as either a left or right subassembly.

Hot Shoe Connector System

In some embodiments of the invention, electric power may be supplied to the monocular subassemblies (or other device mounted on mounting structure 8) to enable certain functions of the device, for example, powering or controlling the imaging device.

According to one aspect of the invention, the electrical connection is made via a hot shoe connection. Hot shoe connectors, per se, are known (e.g., for use in attaching a flash unit to a camera). However, use of a hot shoe in a PNVG is believed novel. This avoids the need to solder an electrical connection and facilitates removal/reattachment of the monocular subassembly.

In some embodiments, it is convenient to provide power to the mounted device through mounting shoes 24, 26. To enable connection of the mounted device with a power supply, electrical conductors (e.g., wires 32, 34, 36, 38) may be routed from mounting shoes 24, 26 to a portion of PNVG System 2 that enables further connection to a power supply (not shown). For example, connectors 28 and 30 may attach to conductors used to bring electrical power to mounting shoes 24, 26.

In some embodiments, two conductors (e.g., 32, 34, 36, 38) may be routed to each mounting shoe 24 and 26. Although two conductors to each shoe are shown, any number and type of conductors sufficient to accomplish some or all of the electrical requirements of the mounted device are possible.

In some embodiments, the conductors (e.g., 32, 34, 36, 38) terminate at connection terminals on mounting shoe 24 and 26. Of course, the number of terminals will be related to the number of conductors. In the embodiment shown in FIG. 3, two terminals 40, 42 are shown on mounting shoe 24 and two terminals 44, 46 are shown on mounting shoe 26.

In some embodiments, terminals 40, 42, 44, 46 are designed to contact complementary portions on the device to be mounted. For example, terminals 40, 42, 44, 46 may contact terminals 406, 408 on the monocular subassembly 10. In this manner, an electrical circuit to the mounted device may be formed.

In some embodiments, terminals 40, 42, 44, 46, 406, 408 are designed to form an electrical connection upon contact with the complementary portion. Contact between terminals may be enabled by proper seating of mounting shoe 24, 26 in complementary shaped mounting portion 400. For example, when shoe 24, 26 is in proper position in mounting portion 400, terminals 40, 42 will contact the counterpart terminals 406, 408. In this manner, electrical connection may be selectively and repeatedly accomplished by merely sliding the device into position on the structure to which the device is mounted.

Other terminals are possible. For example, terminals that enable selective and repeated connection (e.g., pins and sockets, blade connectors, etc.) may be used.

In some embodiments, mounting shoe 24 and mounting shoe 26 may be independently positionable on the structure to which they are mounted. The conductors 32, 34, 36, 38 in those embodiments may be routed with sufficient slack to enable connection and free movement of the mounting shoe throughout the desired range of motion.

Adjustment Control System

In some embodiments, the structure on which the monocular subassemblies are mounted may comprise one or more adjustment control mechanisms. For example, mounting structure 8 may comprise one or more adjustment control mechanisms 18. Adjustment control 18 may comprise suitable knobs, levers, buttons, dials, or other mechanisms that enable the adjustment of the position (e.g., fore, aft, up, down, tilt, lateral, etc.) of mounting structure 8, the associated monocular subassemblies 10, 12, or some combination of the two. In some embodiments, mounting structure 8 may comprise a separate adjustment control 18 for each mounting portion.

In some embodiments, adjustment control 18 may comprise a multi-function control mechanism controlling axis of adjustment using a single mechanism. In some embodiments, adjustment control 18 may comprise multiple knobs, dials, buttons, levers, or a combination thereof, to enable adjustment actions. For example, FIG. 2 shows a two piece coaxial adjustment control 18 comprised of knobs 20 and knob 22. Knob 20 may control a tilt angle and knob 22 may control inter pupillary distance (IPD).

In some embodiments, it may be desirable to enable adjustment of the position of the mounted device with respect to the structure on which it is mounted. For example, the tilt, IPD, fore/aft (e.g., in and out from the user's eyes), vertical, and other orientation parameters may be adjusted.

In some embodiments, adjustment controls may be provided for each mounted device. For example, adjustment controls (indicated at 18) may be used to adjust mounting portion 26 and adjustment controls (indicated at 20 and 22) may be used to adjust mounting portion 24. For brevity, the following discussion focuses primarily on adjustment controls 20 and 22, it should be understood that similar controls may be provided at control 18.

In some embodiments, adjustment controls may comprise separate controls for separate adjustments. For example, knob 20 may comprise a control to adjust IPD and knob 22 may comprise a control to adjust tilt of mounting portion 24. Other control functions may be provided.

Figure 4:
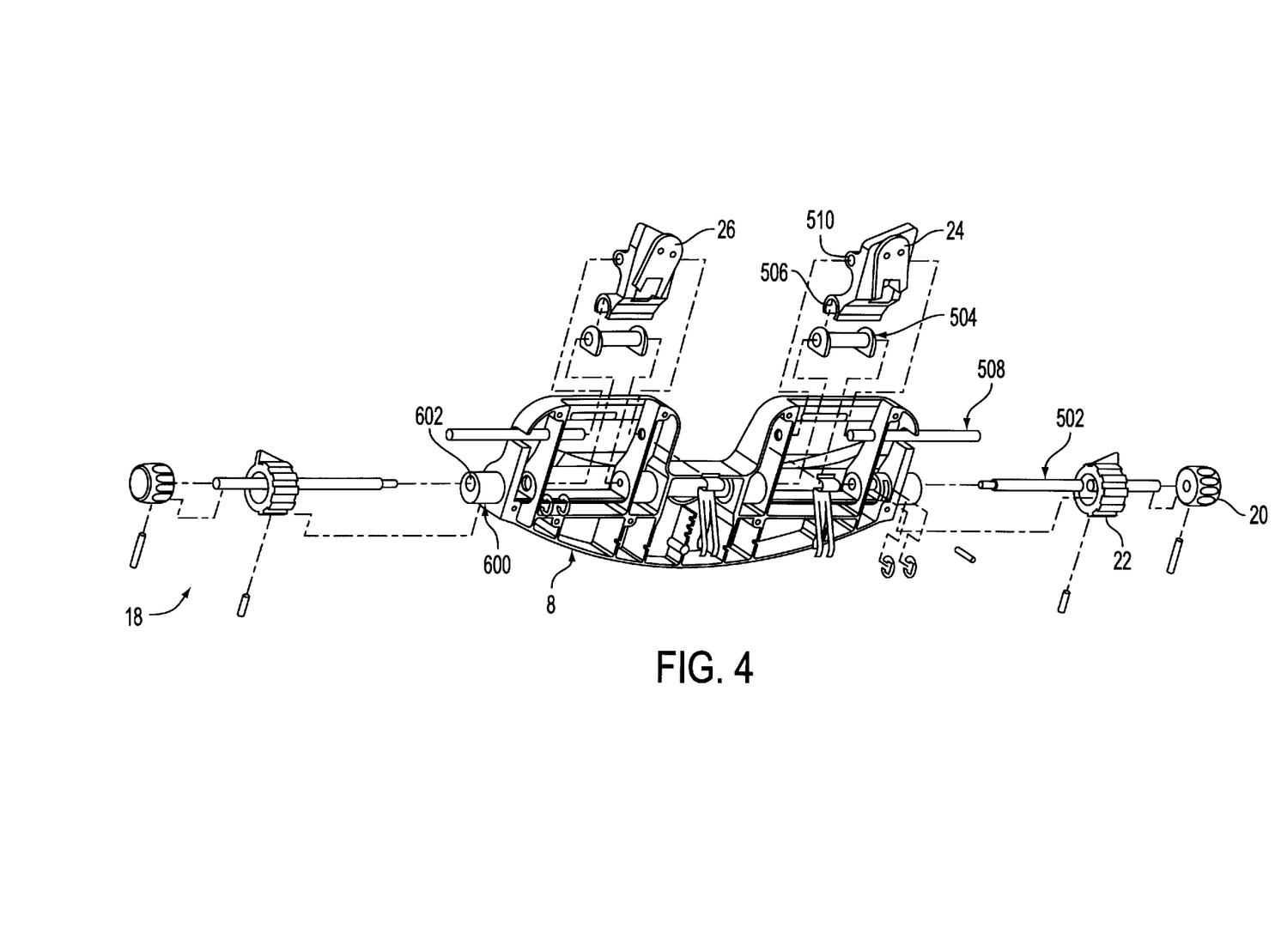
FIG. 4 shows an exploded view of a mounting structure according to one embodiment of the invention.

FIG. 4 shows an exploded view of mounting structure 8 according to one embodiment of the invention. In some embodiments, knob 20 may comprise an IPD adjustment knob and may be operatively connected to shaft 502. Operative connection of knob 20 and shaft 502 may be accomplished in any suitable manner. For example, knob 20 may be attached to shaft 502 using a pin, screw, threaded mount, glue, weld, or any other suitable attachment mechanism.

In some embodiments, shaft 502, may be fed through an open portion of knob 22, so that turning of knob 22 will not affect shaft 502 and vice versa. In this manner, control knobs 22 and 20 may be operated independently.

Shaft 502 may enable a lateral (i.e., side-to-side) motion of mounting portion 24 (e.g., to enable IPD adjustment). Any suitable mechanism for accomplishing the desired motion may be used. For example, shaft 502 may comprise a threaded shaft that mates with a portion of mounting portion 24 to enable lateral travel along the threads as shaft 502 is rotated.

In some embodiments, shaft 502 may mate with a bushing 504 that enables mounting portion 24 to move freely in another direction. For example, bushing 504 may cooperate with shaft 508 and shaft 600 to enable mounting portion 24 to pivot and impart a tilt to mounting portion 24.

In some embodiments, adjustment control knob 22 and shaft 600 may enable a tilt adjustment to mounting portion 24. Any suitable type of shaft may be used to tilt mounting portion 24. For example, shaft 600 may comprise an off center (i.e., eccentric) pivot axis 602 that, when shaft 600 is rotated (e.g., using knob 22), enables mounting portion 24 to tilt. As shown, shaft 600 may comprise a single shaft to enable tilt adjustment for both mounting portions 24, 26. In some embodiments, separate shafts may be provided for each mounting portion.

Multi-Function Control

Figure 5:
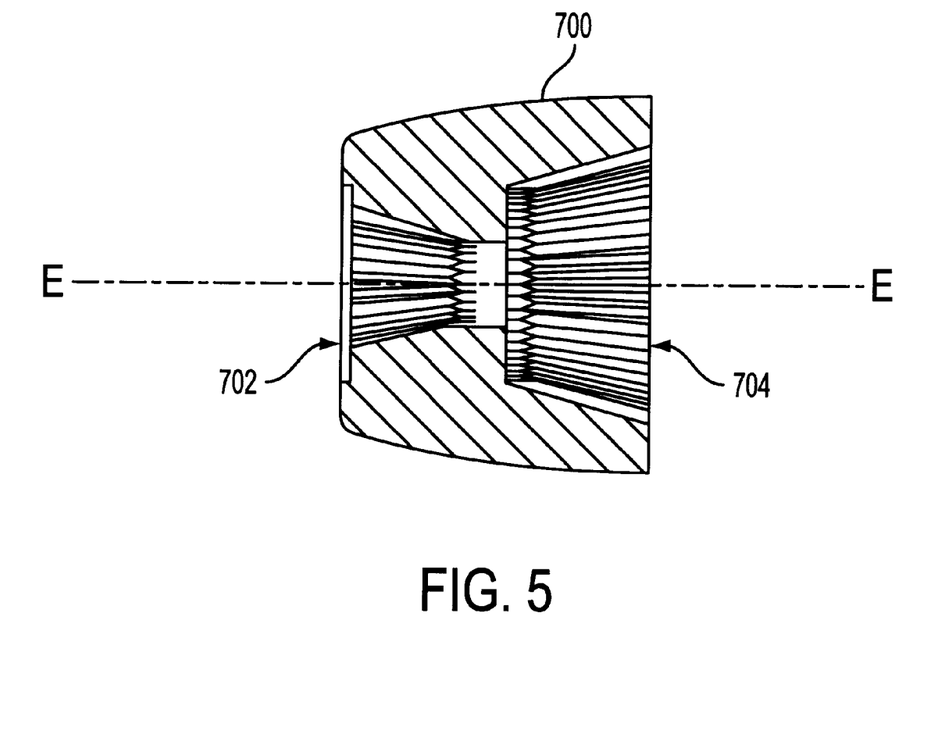
FIG. 5 shows a cross sectional view of a multi-function control according to one embodiment of the invention.

FIG. 5 shows a cross sectional view of a multi-function control according to some embodiments of the invention. Multi-function control may provide a single controller to enable adjustment along various orientation axes. For example, a single controller may be used to selectively and independently control tilt and IPD adjustments, or other axial adjustments.

Controller 18, a multi-function controller, may comprise any suitable knob, lever, button, switch, or other appropriate control mechanism. For example, multi-function controller may comprise a knob 700.

Multi-function controller knob 700 may be configured in an appropriate manner to accomplish multiple functions. For example, multi-function controller knob 700 may comprise a clutch, ratchet, or other appropriate mechanism to enable selective rotation in a predetermined direction.

In the embodiment shown in FIG. 5, multi-function controller knob 700 may comprise a knob that may be positioned at multiple locations along a shaft. For example, FIG. 5 shows a cross sectional view of multi-position knob 700 indicating a first recess 702 and a second recess 704 to enable selective engagement of a shaft or shafts. Some embodiments may include an internal conical gearing on first recess 702 and an internal conical gearing on the second recess 704. Axial movement of multi-position knob 700 along the E—E axis may selectively engage the gearing in the recesses.

The gearing in the recesses may engage suitable mating gearing on a shaft or shafts that enable the desired adjustment. For example, in an embodiment shown in FIG. 6, a shaft 800 has a pinion portion 802 that may mate with the gearing the recess (e.g., recess 702).

Figure 6:
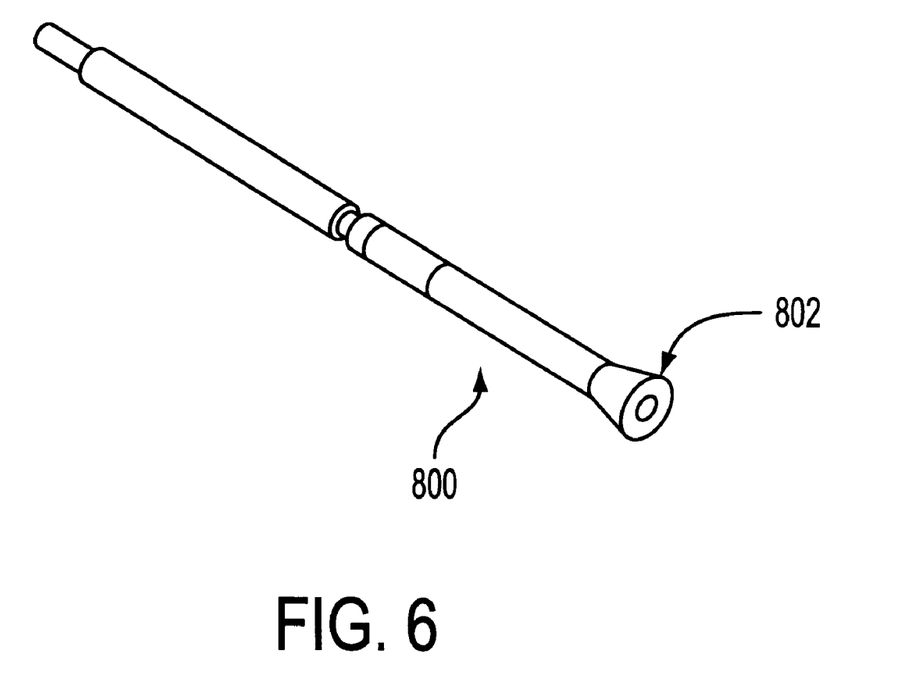
FIG. 6 shows an adjustment shaft according to one embodiment of the invention.
Figure 7:
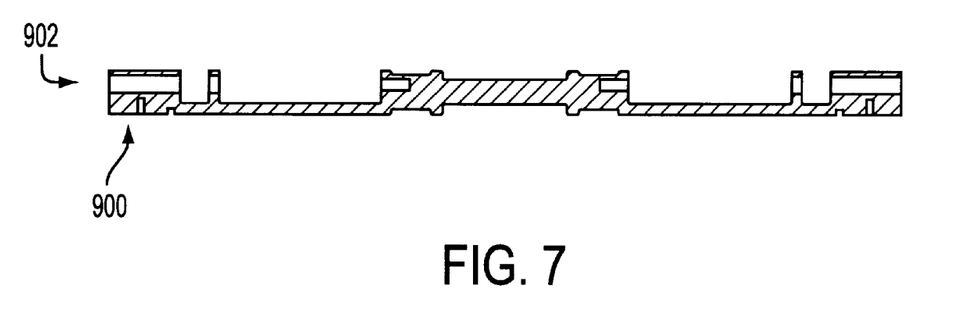
FIG. 7 shows an eccentric adjustment shaft according to one embodiment of the invention.

In the embodiment shown in FIG. 6, shaft 800 may be nested inside another shaft. For example, shaft 800 may nest inside shaft, 900 (shown in FIG. 7) through opening 902. In this fashion, shaft 800 may enable IPD adjustment of a mounting bracket and shaft 900, with an eccentric pivot point (e.g., opening 902) may enable tilt adjustment of a mounting bracket.

In some embodiments, the nested shafts (e.g., 800 and 900) may be arranged so that axial movement of multi-function control knob 700 will selectively engage one or the other of the shafts (e.g., 800 and 900). For example, when multi-function control knob 700 is slid axially to the right along the axis E—E shown in FIG. 5, the gearing in recess 704 will engage mating gearing on shaft 900 and, when multi-function control knob 700 is rotated, cause shaft 900 to rotate. Similarly, when multi-function control knob 700 is slid axially to the left, the gearing in recess 702 will engage mating gearing on shaft 800 and, when multi-function control knob is rotated, cause shaft 800 to rotate.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A head-mounted display system comprising:
   a mounting structure capable of receiving a display device, wherein the structure comprises a first controller operatively connected to a first shaft, wherein the first controller enables adjustment of a position of the display device in a first direction, and
   a second controller, operatively connected to a second shaft, wherein the second controller enables adjustment of a position of the display device in a second direction, wherein the first controller and the second controller are arranged in a coaxial relationship and
   wherein the second shaft is positioned inside an eccentric pivot point in the first shaft.

2. The head mounted display system of claim 1, wherein the first controller and the second controller are embodied in a single knob.

3. The head mounted display system of claim 2, wherein the single knob is axially positionable in at least two positions to enable separate adjustment in the first direction and in the second direction.

4. The head mounted display system of claim 1, wherein the first direction relates to a tilt angle and the second direction relates to a lateral displacement.

* * * * *